United States Patent Office 2,959,601
Patented Nov. 8, 1960

2,959,601
STEROIDAL TRANS-HEXAHYDROTEREPH-THALATE ESTERS

Andre Allais, Paris, and Charles Hoffmann, Noisy le Grand, France, assignors to Les Laboratoires Francais de Chimiotherapie, Paris, France, a corporation of France No Drawing. Filed July 6, 1956, Ser. No. 596,166

Claims priority, application France Aug. 26, 1955

5 Claims. (Cl. 260—397.4)

This invention relates to a method of preparing new acylated derivatives of steroid hormones, and more particularly to a method of preparing acylated derivatives of steroid hormones which are distinguished by prolonged activity and by satisfactory solubility in vegetable oils which are used as the injecting medium. The invention furthermore also relates to said acylated derivatives.

These new products are derived from trans-hexahydroterephthalic acid

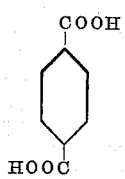

in which one of the carboxyl groups has been previously esterified by an aliphatic alcohol.

With the above in view, it is an object of this invention to prepare new acylated derivatives of steroid hormones.

Another object of the invention is to provide a method of preparing oil soluble acylated derivatives of steroid hormones.

One further object of the invention is to prepare new products derived from trans-hexahydroterephthalic acid in which one of the carboxyl groups has been previously esterified.

Still another object of the invention is to provide new products of trans-hexahydroterephthalic acid containing the radical of a steroid hormone.

Other objects and features of the invention will become apparent from the following detailed description and illustrations.

The compounds according to the invention, therefore, correspond to the formula:

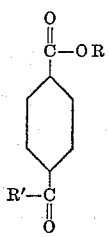

in which R represents an alkyl radical and R', the radical of a steroid hormone.

According to the process of the present invention, the new acylated derivatives are obtained according to methods known per se by the reaction of acid chloride of a hexahydroterephthalic hemiester

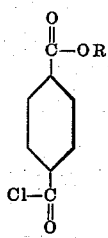

with the steroid in the presence of a tertiary base, such as pyridine, methylethyl pyridine or triethylamine, etc., the operation being carried out at room temperature or in a heated state. The above noted reaction may be carried out with or without a suitable inert solvent such as benzene, toluene, ether, petroleum ether.

The reaction mixture is taken up with a solvent which is not miscible with water, is then washed with diluted mineral acids such as HCl, $H_2SO_4$, $HNO_3$ or $Na_2CO_3$, $K_2CO_3$ carbonate or sodium of potassium bicarbonate and then finally, with water. After drying and distillation of the solvent, new crude mixed hexahydroterephthalates are obtained which are purified by crystallization of chromatography.

The starting acid chlorides as above shown which heretofore were unknown in the past and serve to acylate the steroids, are obtained from hexahydroterephthalic hemiesters than can easily be produced by monosaponification of the corresponding diesters. Also, they may be prepared with less favorable yields, by hydrogenation of the corresponding terephthalic monoester or by monoesterification of trans-hexahydroterephthalic acid. Thionyl chloride is considered most suitable for preparing the new acid chlorides. It is, of course, possible, without thereby exceeding the scope of the invention, to cause the new acid chlorides to react with a derivative of the steroid hormone and to prepare the mixed ester desired from the intermediate product obtained. For example, when preparing a 17 trans-hexahydroterephthalate of 17-hydroxyetiocholanone, it is then possible to brominate this compound at the 4-position and to dehydrobrominate with the formation of the desired ester of testosterone.

The new acylated derivatives may be used dissolved in neutral vegetable oils, to which a glycol may or may not be added, or dissolved in other solvents suitable for injection purposes. The variable concentrations are limited by solubility only. The products, to the preparation of which the present invention relates, may be used in the form of thixotropic salts which are obtained by adding monostearate or aluminum 2-ethyl hexanoate to the oily solutions of these esters. They may also be administtered in the form of microcrystalline aqueous suspensions or emulsions in water, solutions in a third solvent in the presence of a neutral and non-irritating emulsifying agent. The preparations are carried out by means of processes known per se.

The examples that follow herein are given as illustrations only and do not nor are they intended to limit the scope of the invention. More particularly, it is possible to change the nature of the solvents, and of the condensing agent, to work with or without suitable catalysts and to modify the temperature conditions without thereby exceeding the framework of the present invention.

In order to prepare hemiesters of trans-hexahydroterephthalic acids, it is, of course, possible directly to hydrogenate the previously esterified terephthalic acid.

When preparing mixed esters of the present invention it is, of course, possible first to prepare the trans-hexahydrophthalate of the steroid hormone selected and then to esterify the latter in the manner desired. It is equally possible to cause a hemiester of trans-hexahydroterephthalic acid to react with the steroid hormone in the presence of a suitable esterification catalyst thereby avoiding the use of the acid chloride.

EXAMPLE 1

*Preparation of the acid chloride of n-butyl trans-hemi-hexahydroterephthalate*

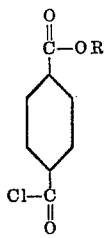

wherein R=the n-butyl radical.

(a) PREPARATION OF DIMETHYLIC ESTER OF TEREPHTHALIC ACID

This ester is prepared according to the method of Ullmann and Schlaepfer (Ber. dtsch. Chem. Ges., 1904, 37 2 002) esterifying terephthalic acid with methanol in the presence of sulfuric acid. Starting with 50 g. of terephthalic acid, 43 g. of the crude diester are obtained which are purified by recrystallization with acetone and treatment with charcoal. This produces 34 g. of dimethyl terephthalate, M.P.=140°.

(b) HYDROGENATION OF DIMETHYLIC ESTER OF TEREPHTHALIC ACID

This is done according to the method of Fichter and Holbro (Helv. Chim. Acta, 1938, 21, 141) by hydrogenating the diester prepared according to (a) above in pure 99% acetic acid and in the presence of platinum oxide. Starting with 30.4 g. of methylic ester, and after absorption of practically the theoretical quantity of hydrogen, filtration of the solution in order to eliminate the platinum oxide and evaporation of the acetic acid under vacuum, a light yellow oil is obtained formed by the mixture of the cis and trans-hexadydroterephthalic dimethylic esters formed quantitatively. This product is sufficiently pure to be transformed by hydrolysis into cis and trans-hexahydroterephthalic acids.

(c) PREPARATION OF TRANS-HEXAHYDROTEREPHTHALIC ACID

This is done according to the method of Fichter and Holbro (Helv. Chim. Acta, 1938, 21, 141) by first hydrolyzing the mixture of the crude diester obtained according to (b) above with hydrochloric acid diluted to 10% and by then rearranging the mixture of cis and trans-hexahydroterephthalic acids into trans-hexahydroterephthalic acid by heating with concentrated hydrochloric acid under pressure at a temperature of 125° for 15 hours.

In order to hydrolyze the diester mixture, 49.2 g. of the crude product are heated with 492 cm.³ of 10% hydrochloric acid for 4 hours in a boiling water bath. The oil gradually changes into white crystals. Having been cooled, the product is centrifuged (desiccated), washed with water and again dried. The mother liquor supplies, by concentration, a second crop of the mixture of cis and trans-hexahydroterephthalic acids. The total yield is approximately 40 g.

29 g. of this isomeric mixture are heated in a sealed tube with 35 cm.³ of concentrated hydrochloric acid at 125° for 15 hours. The mix is then cooled after which the tube is opened and the contents are centrifuged (desiccated), washed with a little ice water, then made into paste twice with chloroform in order to remove any possible cis isomer residue which is very soluble therein and dried. From the above 27.4 g. of trans-hexahydroterephthalic acid are produced having a M.P.=above 300° C. (sublimation), or a yield of 90–91%. The product can be purified by recrystallizing in boiling water.

(d) PREPARATION OF n-DIBUTYLIC ESTER OF TRANS-HEXAHYDROTEREPHTHALIC ACID

This compound is easily prepared by esterifying trans-hexahydroterephthalic acid prepared according to (c) above with n-butanol in the presence of concentrated sulfuric acid.

The following are mixed and heated on refluxing for 4 hours:

Trans-hexahydroterephthalic acid _____grams__ 26.8
Redistilled n-butanol _____vols__ 5
Concentrated sulfuric acid _____cm.³__ 2

After 4 hours of boiling, the excess butanol is vacuum distilled, then taken up twice with benzene which is distilled each time. This produces a light-yellow oil which is dissolved in 100 cm.³ of ether. The ethereal solution is washed twice with a solution of 5% sodium carbonate, then with water until the wash water is neutral. The solution is dried over sodium sulfate, the ether is distilled off and the residue then taken up with light petroleum ether. This solution is filtered and evaporated until dry. The remaining oil is left to cool under refrigeration and then crystallized. This is centrifuged, and, after drying, there remain 43.5 g. (98%) of crude dibutylic ester having a M.P.=30–32°. The product distills completely under 0.5 mm. at 146–148° C. When cooled the distilled product crystallizes into colorless needles having the same melting point as before. It is soluble in alcohol, ether, petroleum ether, acetone, benzene and chloroform, insoluble in water, aqueous diluted acids and alkalis. This is a new compound having the following characteristics:

Saponification number as calculated _____ 394
As found _____ 387.5–389

(e) PREPARATION OF n-BUTYLIC HEMIESTER OF TRANS-HEXAHYDROTEREPHTHALIC ACID

This compound is prepared by monosaponification of the diester prepared according to (d) above.

12.5 g. of potassium hydroxyde dissolved in 30 cm.³ of water are introduced, while stirring, into a solution of 56.9 g. of dibutyl ester in 435 cm.³ of n-butanol. The stirring is continued for four days at room temperature. The butanol is then distilled under vacuum and taken up three times with benzene which is distilled each time producing a white solid residue formed by the potassium salt of the desired hemister. This residue is dissolved in water. The aqueous solution is then washed twice with ether in order to extract the non-saponified diester and is then acidified with concentrated hydrochloric acid until it turns Congo red to blue. The n-butylic hemiester is then extracted with chloroform. A little diacid precipitates in the aqueous solution, from which it is separated by filtration. The chloroform solution is washed with water until neutral, then is dried over sodium sulfate and then distilled until dry. The residue is taken up with light petroleum ether which is removed under vacuum. The result obtained is an almost pure crystallized product having a melting point between 55–56° C. The yield is about 66%. On the other hand, about 10% of the non-converted dibutyl ester is recovered from the ether, with which the aqueous solution of the potassium salt of the hemiester has been washed.

In order to purify the hemiester, it is dissolved in two volumes of petroleum ether whose boiling point range is E=35 to 75° which is then cooled to —30-40° C., and allowed to crystallize. The crystals are centrifuged (desiccated) at said temperature. The product assumes the shape of small crystals with a M.P.=56–57° C. and is soluble in organic solvents and diluted alkalis, but insoluble in water and aqueous diluted acids.

Analysis of the product obtained shows the formula $C_{12}H_{20}O_4$ with a molecular weight of 228.

The composition calculated is as follows: C, 63.1%; H, 8.8%; O, 28.9%. The composition as found is as follows: C, 63.2%; H, 8.9%; O, 28.4.

It is to be noted that the substance above with the formula given is a new compound.

(f) TRANSFORMATION OF THE n-BUTYLIC HEMIESTER OF TRANS-HEXAHYDROTEREPHTHALIC ACID INTO ACID CHLORIDE

Three gms. of n-butyl hemiester of trans-hexahydroterephthalic acid and 4.4 cm.³ of thionyl chloride are heated in a bath to 50° C. in the absence of moisture.

After one hour of heating, the temperature of the bath is solwly raised from 50 to 80° in 45 minutes. The excess thionyl chloride is then distilled and the distillate taken up twice with 5 cm.³ of anhydrous benzene, after which it is distilled. The residue is constituted by 3 g. of the desired acid chloride, which is oily and of light yellow color.

Chemical analysis of the product above shows the formula of $C_{12}H_{19}O_3Cl$ with a molecular weight of 246.7.

| | Percent |
|---|---|
| The amount of calculated chlorine is | 14.4 |
| The amount found is | 14.0 |

The products, therefore, comprise 97% of pure chloride which decomposes when its distillation is attempted. It is used, as is, for reaction with testosterone. This product is a new compound.

EXAMPLE 2

*Preparation of the acid chloride of methyl trans-hexahydroterephthalate*

Trans-hexahydroterephthalic acid such as is prepared in Example 1, is esterified by means of methyl alcohol in lieu of butyl alcohol whose use was described hereinabove. The monosaponification of the dimethyl trans-hexahydroterephthalate is then carried out as above, but by treatment in methanol medium. The purified hemiester is caused to react, as above, with the thionyl chloride thereby producing crude acid chloride which can be used directly for condensation with testosterone.

EXAMPLE 3

*Preparation of acid chloride of isopropyl trans-hemihexahydroterephthalate*

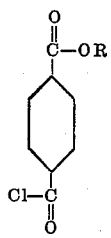

wherein R=iso-propyl.

(a) PREPARATION OF THE DIESTER 15 grams of trans-hexahydroterephthalic acid, 75 cm.³ of pure iso-propyl alcohol and 1.2 cm.³ of concentrated sulfuric acid are heated under reflux conditions for about four hours.

After elimination of the excess iso-propyl alcohol and treatment as indicated above under Example 1 (d), 14.8 g. (66%) of di-iso-propyl ester of trans-hexahydroterephthalic acid are obtained. This is a new product which melts at 80.5° on the Maquenne block and takes the form of small colorless crystals which are insoluble in water, difficultly soluble in ether but soluble in alcohol, acetone, benzene, chloroform.

(b) PREPARATION OF THE HEMIESTER

A solution formed by dissolving 12.9 grams of di-iso-propyl ester of trans-hexahydroterephthalic acid in 105 cm.³ of pure iso-propanol, 2.8 g. of caustic potassium hydroxyde and 3 cm.³ of water is heated to a temperature of about 60° C. for 2 hours. The resultant iso-propanol is eliminated by vacuum distillation, whereupon the residue is taken up with 150 cm.³ of water. Several cm.³ of a 10% sodium carbonate aqueous solution are then added until there is an alkaline reaction. The solution thus obtained is washed with ether, then acidified with concentrated hydrochloric acid and finally extracted with chloroform. The chloroform solution is washed with water, dried over magnesium sulfate and finally vacuum evaporated until dry.

According to the above method there are produced 6.7 grams (85%) of iso-propyl hemiester of trans-hexahydroterephthalic acid having a M.P.=88–89° C. on the Maquenne block. This new product which has not been described heretofore, takes the form of colorless needles, insoluble in water but soluble in alcohol, ether, acetone, benzene and chloroform.

For purposes of analysis, it is recrystallized in 20 volumes of petroleum ether Eb. 35–75°. Its analysis shows the formula as $C_{11}H_{18}O_4$ having a molecular weight of 132.1.

The composition as calculated shows C, 61.7%; H, 8.5%; O, 29.8%. As found it shows C, 61.7%; H, 8.5%; O, 29.8%.

PREPARATION OF THE ACID CHLORIDE

The procedure indicated under Example 1 (f) is followed by heating the hemiester in the presence of thionyl chloride.

EXAMPLE 4

*Preparation of the acid chloride of n-octyl trans-hemihexahydroterephthalate*

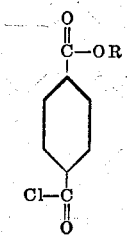

wherein R=n-octyl.

(a) Preparation of the diester. The following is heated under reflux conditions for 3 hours:

| | |
|---|---|
| Trans-hexahydroterephthalic acid | grams 8 |
| N-octyl alcohol | cm.³ 40 |
| Concentrated sulfuric acid | cm.³ 0.6 |

This mixture is then cooled, neutralized by adding 2.5 g. of barium carbonate and filtered. One volume of ether is next added to the filtrate. It is washed with a 5% sodium carbonate aqueous solution, with water, dried over sodium sulfate and vacuum evaporated until dry. The residue supplies, after vacuum distillation, 12.6 grams (68%) of di-n-octyl ester of trans-hexahydroterephthalic acid.

The last-named product which is new, takes the form of a colorless oil whose boiling range, Eb., under 0.8 mm. is 200–225° C. It is insoluble in water and soluble in organic solvents. It is sufficiently pure for subsequent transformation into the hemiester which is given hereinfollowing.

(b) Preparation of the hemiester: A solution consisting of 10 grams of n-octyl di-ester of trans-hexahydroterephthalic acid, 50 cm.³ of n-octyl alcohol, 1.51 g. of caustic potassium hydroxyde and 2 cm.³ of water is allowed to stand for 48 hours at room temperature. The n-octyl alcohol is eliminated by vacuum distillation, 200 cm.³ of water are added to the residue, the solution is then washed with ether, acidified with concentrated hydrochloric acid and extracted with chloroform. The chloroform solution is washed with water, dried over magnesium sulfate and vacuum evaporated until dry.

From the above procedure there are obtained 4.2 grams (58%) of n-octyl hemiester of trans-hexahydroterephthalic acid, having a M.P.=50° C. on the Maquenne block. This product, which has not been described or known heretofore, is crystalline in shape, insoluble in water, but soluble in organic solvents such as alcohols, benzene, chloroform. To be analyzed, it is recrystallized in 1 volume of petroleum ether having a boiling point Eb. 35–75°.

Its chemical analysis shows the formula as $C_{16}H_{28}O_4$ and the molecular weight as 284.2.

Its composition as calculated is: C, 67.6%; H, 9.9%; O, 22.5%. As found C, 67.8%; H, 10.1%; O, 22.7%.

(c) The preparation of the acid chlorides is effected by proceeding as indicated under Example 1 (f), by heating the hemiester in the presence of thionyl chloride.

*Example 5*

Preparation of mixed n-butyl and testosterone trans-hexahydroterephthalate:

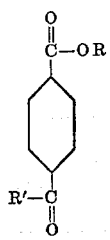

wherein R=n-butyl radical and R'=

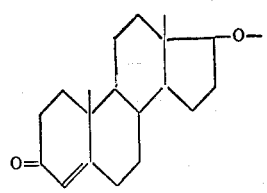

2 grams of testosterone are dissolved in 3 cm³ of pyridine. 2.1 grams of acid chloride of the hexahydroterephthalic n-butylic hemiester prepared according to Example 1, are dissolved in 2 cm.³ of benzene, are slowly added to the above solution while stirring and cooling the flask by means of an ice bath. The reaction is exothermic, from which pyridine hydrochloride quickly precipitates. The reaction mixture which has taken on a pink color is left standing for 24 hours. It is then stirred or shaken for 15 minutes with 20 cm.³ of water in order to destroy the excess acid chloride, and is then extracted with iso-propylic ether. The ethereal solution is washed with hydrochloric acid, then with sodium carbonate and finally with water until neutral. It is dried over sodium sulfate, and the ether is expelled. There results a crystallized residue melting at about 95° C. formed by the crude mixed ester. Subjected to chromatography in benzene solution over alumina, one obtains, by washing out with the same solvent, a fraction melting between 70 and 95° C. A second washing or eluate obtained with benzene comprising 10% ethyl ether melts between 100 and 110°.

A second chromatography carried out separately on each of these fractions results in the same principal product having a M.P.=110°, with a total yield of about 60%. This product is formed by the desired mixed n-butyl and testosterone trans-hexahydroterephthalate. The melting point does not go up after recrystallization in petroleum ether whose boiling point E is 50–70° followed by a new crystallization in 50%-ethanol. The product takes the form of small colorless crystals with a M.P. of 110°, /α/$_D^{20}$=81.5° (c.=1%, ethanol). It is very soluble in all organic solvents except petroleum ether. Its solubility in olive oil is 10% which compares favorably with that of the other esters of testosterone.

Its chemical analysis shows the formula of $C_{31}H_{46}O_5$ and the molecular weight of 498.6.

The composition as calculated is: C, 74.66%; H, 9.29%; O, 16.04%. The composition as found is: C, 74.9%; H, 9.3%; O, 16.3%. This is a new compound.

When this compound is tried out on the castrated male rat in the test of modifying the weight of the seminal vesicles at the does corresponding to 17 mg. of testosterone, or 30 mg. of the product, it is found that the average weight of the vesicles at the end of 10 days is 635 mg., at the end of 17 days, 666 mg., and at the end of 24 days 621 mg.

If an equivalent dose of testosterone propionate is administered, namely, 20.8 mg., the respective weights are 299, 48 and 30 mg., which proves that the new product has a greater as well as more prolonged activity. Using testosterone oenanthate, always at a dose equivalent of 17 mg. of testosterone, namely, 24.1 mg. of oenanthate, the corresponding figures are 452, 514 and 465 mg. Even in this case the superiority of the new product is clearly established.

EXAMPLE 6

*Preparation of mixed n-butyl and estradiol trans-hexahydroterephthalate*

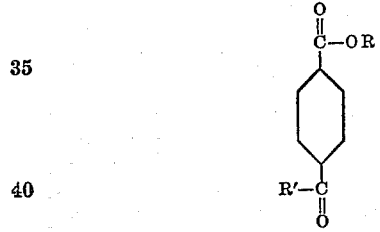

wherein R=n-butyl radical and R'=

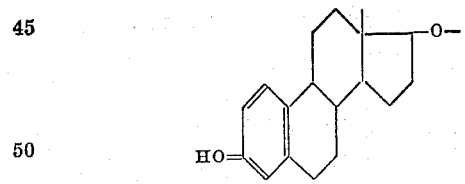

1.25 g. of n-butylic hemiester of trans-hexahydroterephthalic acid prepared according to Example 1 above and 5 cm.³ of thionyl chloride are heated under reflux conditions for half an hour. The excess chlorinating agent is expelled under vacuum, whereupon the residue is taken up with 6 cm.³ of benzene, then cooled to 10° C. and poured into a solution of 1.14 g. of estradiol 3-monoacetate in 5.7 cm.³ of pyridine which has been cooled to 10° C. This mix is then left for two hours at room temperature, after which 1 cm.³ of water is added. It is then poured into N hydrochloric acid and extracted with chloroform. The combined extracts are washed with water, with N/5 sodium hydroxyde, dried over magnesium sulfate and vacuum evaporated until dry. The residue is taken up with 40 cm.³ of ethanol, to which 0.5 cm.³ of caustic sodium hydroxyde is added. It is then left to stand for half an hour at 20° C. then poured into water, acidified with concentrated hydrochloric acid and extracted with ether. The combined ethereal extracts are dried, then evaporated until dry.

By the above reactions there is produced a colorless residue which crystallizes when taken up with 90% methanol. The yield is 1.1 g. (60%) n-butyl and estradiol trans-hexahydroterephthalate having a M.P. =136° C. /α/$_D^{20}$=45°±2 (c.=0.5%, ethanol). The product takes the form of fine, thin colorless needles which are insoluble in water but soluble in acetone, benzene, chloroform, and very soluble in ether. It has not been described in the past and is a new product.

Its chemical analysis shows the formula $C_{30}H_{42}O_5$ and the molecular weight as 482.6.

Its composition as calculated is: C, 74.6%; H, 8.8%.
Its composition as found is: C, 74.6%; H, 8.8%.

EXAMPLE 7

*Preparation of mixed n-butyl and cortisone trans-hexahydroterephthalate*

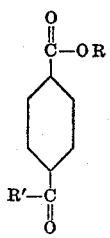

wherein R=n-butyl radical and R'=

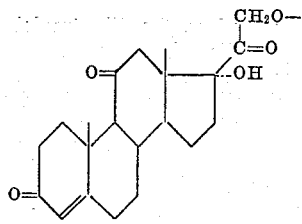

The procedure under this example is the same as in the preceding example. 1 g. of n-butyl hemiester of trans-hexahydroterephthalic acid, 4 cm.³ of thionyl chloride, the acid chloride being taken up with 5 cm.³ of benzene, and 1 g. of cortisone in 5 cm.³ of pyridine are mixed together at room temperaure.

When the reaction is complete, 1 cm.³ of water is then added, and the resultant solution poured into N hydrochloric acid. The product is extracted with chloroform, then washed with water, with N soda, again with water, and then dried over magnesium sulfate and evaporated until dry. The residue is taken up with a mixture of 60 cm.³ of ethanol and 6 cm.³ of chloroform. To this is added a solution of 150 mg. of sodium periodate and 1.5 cm.³ of N sulfuric acid in 10 cm.³ of water, and the mix is left undisturbed for half an hour at 25° C. The whole mix is then poured into water and extracted with chloroform. The extract is washed with water and dried over magnesium sulfate. The chromatography is carried out over 40 g. of neutral alumina. Elution with a 10%-methanol chloroform produces, after evaporation until dry and crystallization occurs in aqueous acetone, 750 mg. (50%) of n-butyl and cortisone trans-hexahydroterephthalate, having a M.P.=189° C., /α/$_D^{20}$=+148°±2 (c.=0.5% acetone). This resultant product which is new, takes the form of colorless spangles or flakes which are insoluble in water, difficultly soluble in alcohol and ether, soluble in acetone, benzene and chloroform.

The chemical analysis shows the formula to be $C_{33}H_{46}O_8$ whose molecular weight is 570.7.

The composition is calculated as: C, 69.4%; H, 8.1%; O, 22.4%. The composition as found: C, 69.2%; H, 8.2%; O, 22.8%.

EXAMPLE 8

*Preparation of mixed n-butyl and prednisone trans-hexahydroterephthalate*

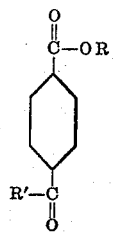

wherein R=n-butyl radical and R'=

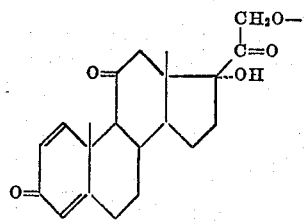

The procedure herein is substantially the same as in Example 6.

1.5 g. of n-butylic hemiester of trans-hexahydroterephthalic acid, 6 cm.³ of thionyl chloride, the acid chloride being taken up with 7.5 cm.³ of benzene, and 1.5 g. of prednisone, or Δ¹-dehydrocortisone, in 7.5 cm.³ of pyridine are mixed together at room temperature.

When the reaction is complete, 1 cm.³ of water is added. The whole mix is poured into N hydrochloric acid and then extracted with chloroform. The combined extracts are washed with water, with N sodium hydroxide, dried over magnesium sulfate, and the chromatography thereof is carried out over 40 g. of neutral alumina. Elution with chloroform produces, after evaporation until dry and crystallization in ether, 800 mg. (50%) of n-butyl and prednisone trans-hexahydroterephthalate having the following characteristics: M.P.=189° C., /α/$_D^{20}$=+140°±2 (c.=0.5% acetone).

This product which has not been described heretofore and which is new is in the form of colorless spangles or flakes. It is insoluble in water, difficultly soluble in ether, but soluble in alcohol, acetone, benzene and chloroform.

The chemical analysis of the compound shows the formula of $C_{33}H_{44}O_8$ and a molecular weight of 568.7.

The composition as calculated is: C, 69.7%; H, 7.8%.
The composition as found is: C, 69.8%; H, 8.0%.

EXAMPLE 9

*Preparation of mixed methyl and testosterone trans-hexahydroterephthalate*

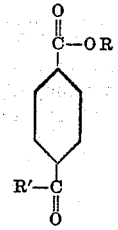

wherein R=methyl radical and R'=

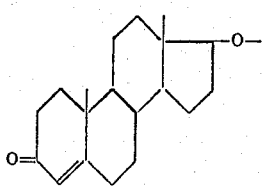

The procedure herein is as in Example 5.

1 g. of methylic hemiester of trans-hexahydroterephthalic acid prepared according to Example 2 herein, 4 cm.³ of thionyl chloride, the acid chloride being taken up with 5 cm.³ of benzene and 1 g. of testosterone in 5 cm.³ of pyridine are mixed together at room temperature.

After the reaction is completed, 1 cm.³ of water is added. This mixture is then poured into N hydrochloric acid and then extracted with chloroform. The combined extracts are washed with water, with N sodium hydroxide solution, dried over magnesium sulfate and then vacuum evaporated until dry. The residue thus obtained is recrystallized in aqeous methanol to produce 1.1 g. 70% strength of methyl and testosterone trans-hexahydroterephthalate having the following characteristics: M.P.=161° C., $/\alpha/_D^{20} = +96° \pm 2$ (c.=0.5%, chloroform).

This product which is new takes the form of colorless spangles or flakes which are insoluble in water, soluble in alcohol, ether, acetone, benzene and chloroform.

The chemical analysis of the compound shows the formula of $C_{28}H_{40}O_5$ with a molecular weight of 456.6.

The composition of the new compound as calculated is: C, 73.6%; H, 8.8%; O; 17.5%. The composition of the new compound as found is: C, 73.6%; H, 8.9%; O, 17.9%.

EXAMPLE 10

*Preparation of mixed isopropyl and testosterone trans-hexahydroterephthalate*

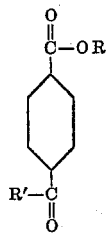

wherein R=isopropyl radical and R'=

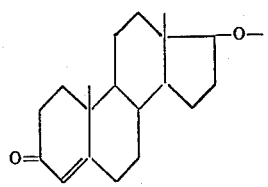

The procedure herein is the same as in Example 5.

1.5 g. of iso-propylic hemiester of trans-hexahydroterephthalic acid prepared according to Example 3, 6 cm.³ of thionyl chloride, the acid chloride being taken up with 6 cm.³ of benzene and 1 g. of testosterone in 5 cm.³ of pyridine are mixed together at room temperature.

When the reaction is completed, the benzene solution is washed with water, with 2 N hydrochloric acid, again with water and then with sodium bicarbonate, with water, the product is dried over magnesium sulfate, and the chromatography is carried out over 30 g. of neutral alumina. Elution with ether supplies, after evaporation until dry and crystallization in isopropylic ether, 500 mg. (30%) of isopropyl and testosterone trans-hexahydroterephthalate having the following characteristics: M.P.=156–157° C., $/\alpha/_D^{20} = +89° \pm 2$ (c.=0.5%, chloroform).

This product which has not been described heretofore and is new takes the form of colorless spangles or flakes which are insoluble in water, very soluble in benzene and chloroform, difficultly soluble in iso-propylic ether.

The chemical analysis of the compound above shows the formula of $C_{30}H_{44}O_5$ with a molecular weight of 484.6.

The composition of the new compound as calculated is: C, 74.3%; H, 9.2%; O, 16.5%. The composition of the new compound as found is: C, 74.3%; H, 9.2%; O, 16.8%.

From the foregoing description taken in conjunction with the accompanying illustrative examples, it will be noted that there has been provided a novel method of preparing acylated derivatives of steroid hormones for medicinal use. It will be also noted that there are provided according to the invention new products derived from trans-hexahydroterephthalic acid which are highly useful in veterinary medicine.

While preferred methods have been described, it is to be understood that modifications in procedure, use of material and their arrangement may be made without departing from the spirit and scope of the invention as claimed.

We claim:

1. As a new product, the 17-estradiol ester of trans-hexahydroterephthalic acid mono-n-butyl ester.
2. As a new product, the testosterone ester of trans-hexahydroterephthalic acid mono-n-butyl ester.
3. As a new product, the 21-cortisone ester of trans-hexahydroterephthalic acid mono-n-butyl ester.
4. As a new product, the 21-prednisone ester of trans-hexahydroterephthalic acid mono-n-butyl ester.
5. As a new product, the testosterone ester of trans-hexahydroterephthalic acid mono-isopropyl ester.

References Cited in the file of this patent

UNITED STATES PATENTS

| Number | Name | Date |
|---|---|---|
| 2,070,770 | Amend | Feb. 16, 1937 |
| 2,183,589 | Reichstein | Dec. 19, 1939 |
| 2,384,955 | Moyle | Sept. 18, 1945 |
| 2,551,575 | Martin | May 8, 1951 |
| 2,653,955 | Rogers | Sept. 29, 1953 |
| 2,655,527 | Hogg | Oct. 13, 1953 |
| 2,746,978 | Ott | May 22, 1956 |
| 2,751,402 | Schneider | June 19, 1956 |
| 2,755,292 | Leslie | July 17, 1956 |
| 2,781,368 | Heyl et al. | Feb. 12, 1957 |
| 2,783,226 | Gould | Feb. 26, 1957 |
| 2,794,036 | Kasper et al. | May 28, 1957 |
| 2,813,880 | Campbell et al. | Nov. 19, 1957 |
| 2,837,464 | Nobile | June 3, 1958 |